US010983533B2

(12) United States Patent
Costas

(10) Patent No.: US 10,983,533 B2
(45) Date of Patent: Apr. 20, 2021

(54) METHOD AND SYSTEM FOR AUTONOMOUSLY OPERATING AN AIRCRAFT

(71) Applicant: The Boeing Company, Chicago, IL (US)

(72) Inventor: Pablo Costas, Madrid (ES)

(73) Assignee: The Boeing Company, Chicago, IL (US)

( * ) Notice: Subject to any disclaimer, the term of this patent is extended or adjusted under 35 U.S.C. 154(b) by 232 days.

(21) Appl. No.: 15/990,447

(22) Filed: May 25, 2018

(65) Prior Publication Data
US 2019/0005828 A1 Jan. 3, 2019

(30) Foreign Application Priority Data
Jun. 29, 2017 (EP) ...................................... 17382412

(51) Int. Cl.
*G05D 1/10* (2006.01)
*G08G 5/00* (2006.01)
(Continued)

(52) U.S. Cl.
CPC ........... *G05D 1/101* (2013.01); *B64C 39/024* (2013.01); *G05D 1/0088* (2013.01); *G06N 3/006* (2013.01);
(Continued)

(58) Field of Classification Search
None
See application file for complete search history.

(56) References Cited

U.S. PATENT DOCUMENTS 8,326,780 B2 * 12/2012 Gupta .................... G06N 20/00
706/14
8,977,484 B1  3/2015 La Civita
(Continued)

FOREIGN PATENT DOCUMENTS

EP  3109805  12/2016

OTHER PUBLICATIONS

Lopez-Leones et al., "The Aircraft Intent Description Language: A Key Enabler for Air-Ground Synchronization in Trajectory-Based Operations," IEEE/AIAA 26$^{th}$ Digital Avionics Systems Conference, Oct. 21-25, 2007, pp. 1.D.4-1-1.D.4-12, IEEE.
Vilaplana et al., "Towards a Formal Language for the Common Description of Aircraft Intent," 24$^{th}$ Digital Avionics Systems Conference, Oct. 30-Nov. 3, 2005, pp. 3.C.5-1-3.C.5-9, vol. 1, IEEE.
(Continued)

*Primary Examiner* — Abdhesh K Jha
(74) *Attorney, Agent, or Firm* — Haynes and Boone LLP

(57) ABSTRACT

A method and system for autonomously operating an aircraft. The method comprises a pre-flight training step comprising: retrieving recorded surveillance data of a plurality of flights corresponding to at least one aircraft type and at least one route; inferring aircraft intent from the recorded surveillance data; computing reconstructed trajectories using the inferred aircraft intent; selecting a training dataset comprising aircraft intent and reconstructed trajectories of flights corresponding to a particular aircraft type and route; and applying a machine learning algorithm on the training dataset to obtain a mapping function between aircraft states and actions. The method further comprises a real-time control step executed during a flight of an aircraft, the real-time control step comprising: repeatedly retrieving onboard sensor data; obtaining real-time aircraft states from the onboard sensor data; determining actions associated to the real-time aircraft states using the mapping function; and executing the selected actions on the aircraft.

20 Claims, 3 Drawing Sheets

(51) Int. Cl.
| | | |
|---|---|---|
| *G08G 5/04* | (2006.01) | |
| *G06N 20/00* | (2019.01) | |
| *B64C 39/02* | (2006.01) | |
| *G05D 1/00* | (2006.01) | |
| *G06N 3/00* | (2006.01) | |
| *G06N 7/00* | (2006.01) | |

(52) U.S. Cl.
CPC .............. *G06N 7/005* (2013.01); *G06N 20/00* (2019.01); *G08G 5/0034* (2013.01); *G08G 5/0078* (2013.01); *G08G 5/045* (2013.01); *B64C 2201/141* (2013.01)

(56) References Cited

U.S. PATENT DOCUMENTS

| | | |
|---|---|---|
| 9,366,538 B2 | 6/2016 | D'Alto et al. |
| 2015/0017609 A1* | 1/2015 | Leao ........................ G09B 9/08 434/30 |
| 2016/0070264 A1* | 3/2016 | Hu ........................ G08G 5/0069 701/2 |

OTHER PUBLICATIONS

Corey Montella et al.: "Reinforcement learning for autonomous dynamic soaring in shear winds", 2014 IEEE/RSJ International Conference on Intelligent Robots and Systems, IEEE, Sep. 14, 2014, pp. 3423-3428.

Stefan Suck et al: "Aircraft Pilot Intention Recognition for Advanced Cockpit Assistance Systems", Jun. 21, 2016, Network and Parallel Computing, Springer International Publishing, pp. 231-240.

\* cited by examiner

METHOD AND SYSTEM FOR AUTONOMOUSLY OPERATING AN AIRCRAFT

CROSS-REFERENCE TO RELATED APPLICATION

This application claims priority to, and the benefit of, European Patent Application No. EP 17382412.9, filed on Jun. 29, 2017, the entire disclosure of which is expressly incorporated by reference herein.

FIELD

The present disclosure is comprised in the field of avionics, and relates to methods and systems for autonomously operating an aircraft.

BACKGROUND

Single pilot operations (SPO)—i.e. flying a commercial aircraft with only one pilot in the cockpit—, fully automated commercial airplanes and unmanned air vehicles (UAV), need to be assisted by advanced onboard automation tools.

Crew cost and crew availability are typical key business drivers for an airline. Improvements in these areas lead to cost reduction and an increase of business revenues. However, the operation of commercial aircraft, especially freighters, in an autonomous way must be safely performed.

A critical part on any autonomous system is training. To some extent, current training methods include data driven modelling of flight dynamics, flight control and trajectory planning on unmanned aircraft that learn from data available for small vehicles.

However, data availability is an important drawback of current data-driven UAV training systems, and there is no existing solution that addresses the problem of training an on-board automation tool based on surveillance data. Although there are researches for specific models of small UAV trained with data from a particular sensor, none of the current training methods are generic (i.e. they cannot be generalized and implemented on any unmanned vehicle). Besides, management of uncertainty present on training data is not taken into account on current data driven training systems.

Therefore, there is a need to provide a new process to train and operate an aircraft onboard command and control system that overcome the existing drawbacks.

SUMMARY

The present disclosure refers to a method and a system for autonomously operating an aircraft which has been trained to operate and fly autonomously, removing all the complexity derived from autonomous vehicle training by exploiting surveillance recorded data to instruct the optimal actions to take as a response to onboard sensor data.

Inferring navigation and guidance commands from historical surveillance data of commercial aircraft and developing a system capable of applying these commands based on onboard sensor readings is a new approach for autonomous vehicles. The surveillance data can be easily obtained, for instance, from the FAA System Wide Information Management (SWIM) infrastructure or from global flight tracking providers. The surveillance data may include, among other data, radar and/or ADS tracks.

The proposed method allows tailored autonomous commanding and controlling of aircraft according to the actual aircraft performance and capabilities using a learning process that leverages recorded flight data. The only inputs needed for training are time-evolving sequences of aircraft historical positions obtained from radar data or ADS data, like ADS-B or ADS-C. The onboard automation tool is instructed on the optimal actions to take to command the aircraft on behalf of a human. These actions are expressed in Aircraft Intent Description Language (AIDL) format, as described for instance in Lopez-Leones, Javier, et al., "The aircraft intent description language: a key enabler for air-ground synchronization in trajectory-based operations", 2007 IEEE/AIAA 26th Digital Avionics Systems Conference; and in Vilaplana, Miguel A., et al. "Towards a formal language for the common description of aircraft intent." 24th Digital Avionics Systems Conference. Vol. 1. IEEE, 2005.

In accordance with one aspect of the present disclosure there is provided a method of autonomously operating an aircraft, the method comprising a pre-flight training step comprising and a real-time control step executed during the flight of an aircraft.

The pre-flight training step comprises retrieving recorded surveillance data of a plurality of flights corresponding to at least one aircraft type and at least one route; inferring aircraft intent from the recorded surveillance data; computing reconstructed trajectories using the inferred aircraft intent; selecting a training dataset comprising aircraft intent and reconstructed trajectories of flights corresponding to a particular aircraft type and route; and applying a machine learning algorithm on the training dataset to obtain a mapping function between aircraft states and actions.

The real-time control step comprises repeatedly retrieving onboard sensor data; obtaining real-time aircraft states from the onboard sensor data; determining actions associated to the real-time aircraft states using the mapping function; and executing the selected actions on the aircraft.

According to an embodiment, the aircraft intent is expressed in AIDL format, and the actions comprise navigation and guidance commands expressed as AIDL instructions. The mapping function may comprise a table mapping sensor values with AIDL instructions. The step of determining actions may comprise searching the mapping table for sensor values corresponding to the retrieved onboard sensor data and, if no exact match is found, using an interpolation process to determine the associated AIDL instructions.

In an embodiment, the machine learning algorithm is a reinforcement learning algorithm that obtains a policy $\pi$ maximizing an accumulated reward R associated to the aircraft state that matches the landing of the flight at a destination airport. The reinforcement learning algorithm may comprise solving six independent Markov Decision Process for predicting six independent AIDL instructions, wherein action and state spaces are different for each AIDL thread.

In accordance with a further aspect of the present disclosure there is provided a system for autonomously operating an aircraft, comprising:

An inferring and trajectory reconstruction module configured to infer aircraft intent from recorded surveillance data of a plurality of flights corresponding to at least one aircraft type and at least one route; and computing reconstructed trajectories using the inferred aircraft intent.

A clustering module configured to select a training dataset comprising aircraft intent and reconstructed trajectories of flights corresponding to a particular aircraft type and route.

A machine learning module configured to apply a machine learning algorithm on the training dataset to obtain a mapping function between aircraft states and actions.

An onboard command and control automation module (340) configured to repeatedly retrieve onboard sensor data (210) during a flight of an aircraft; obtain real-time aircraft states (222) from the onboard sensor data (210); determining actions (224) associated to the real-time aircraft states (222) using the mapping function (180); and instructing the execution of the selected actions (224) on the aircraft.

In an embodiment, the onboard command and control automation module is configured to determine actions by searching a mapping table (mapping sensor values with AIDL instructions) for sensor values corresponding to the retrieved onboard sensor data and, if no exact match is found, using interpolation to determine the associated AIDL instructions.

The machine learning module may be a reinforcement learning module configured to obtain a policy π maximizing an accumulated reward R associated to the aircraft state that matches the landing of the flight at a destination airport. In an embodiment, the reinforcement learning module is configured to solve six independent Markov Decision Process for predicting six independent AIDL instructions, wherein action and state spaces are different for each AIDL thread.

The system may comprise an aircraft Flight Management System for executing the selected actions on the aircraft.

In accordance with yet a further aspect of the present invention there is provided a computer program product for autonomously operating an aircraft, comprising at least one computer-readable storage medium comprising a set of instructions stored therein which, when executed by a processor, causes the processor to perform the steps of the method.

The present method can be used for autonomous vehicle navigation techniques of commercial aircraft and UAV, and is especially valuable as it can be applied to any commercial aircraft regardless the aircraft type, just changing the learning dataset. Training datasets can be obtained from multiples sources, such as ADS-B providers, Federal Aviation Administration or equivalent organizations around the globe, and airlines (e.g. from QAR—Quick Access Recorder—).

The features, functions, and advantages that have been discussed can be achieved independently in various embodiments or may be combined in yet other embodiments further details of which can be seen with reference to the following description and drawings.

DRAWINGS

A series of drawings, which aid in better understanding the invention and which are expressly related with an embodiment of said invention, presented as a non-limiting example thereof, are very briefly described below.

DESCRIPTION

The present disclosure refers to a method that produces guidance commands as output based on current onboard sensor readings for autonomous operations. An onboard command and control automation system is trained in advance using recorded historical surveillance data.

The invention implements a machine learning process under uncertainty using Reinforcement Learning methods (such as the one described in Richard S. Sutton & Andrew G Barto, "Reinforcement Learning: An Introduction", MIT Press, Cambridge, Mass.) applied to a description of the aircraft intent as defined by the AIDL (Aircraft Intent Description Language) format.

Figure 1:
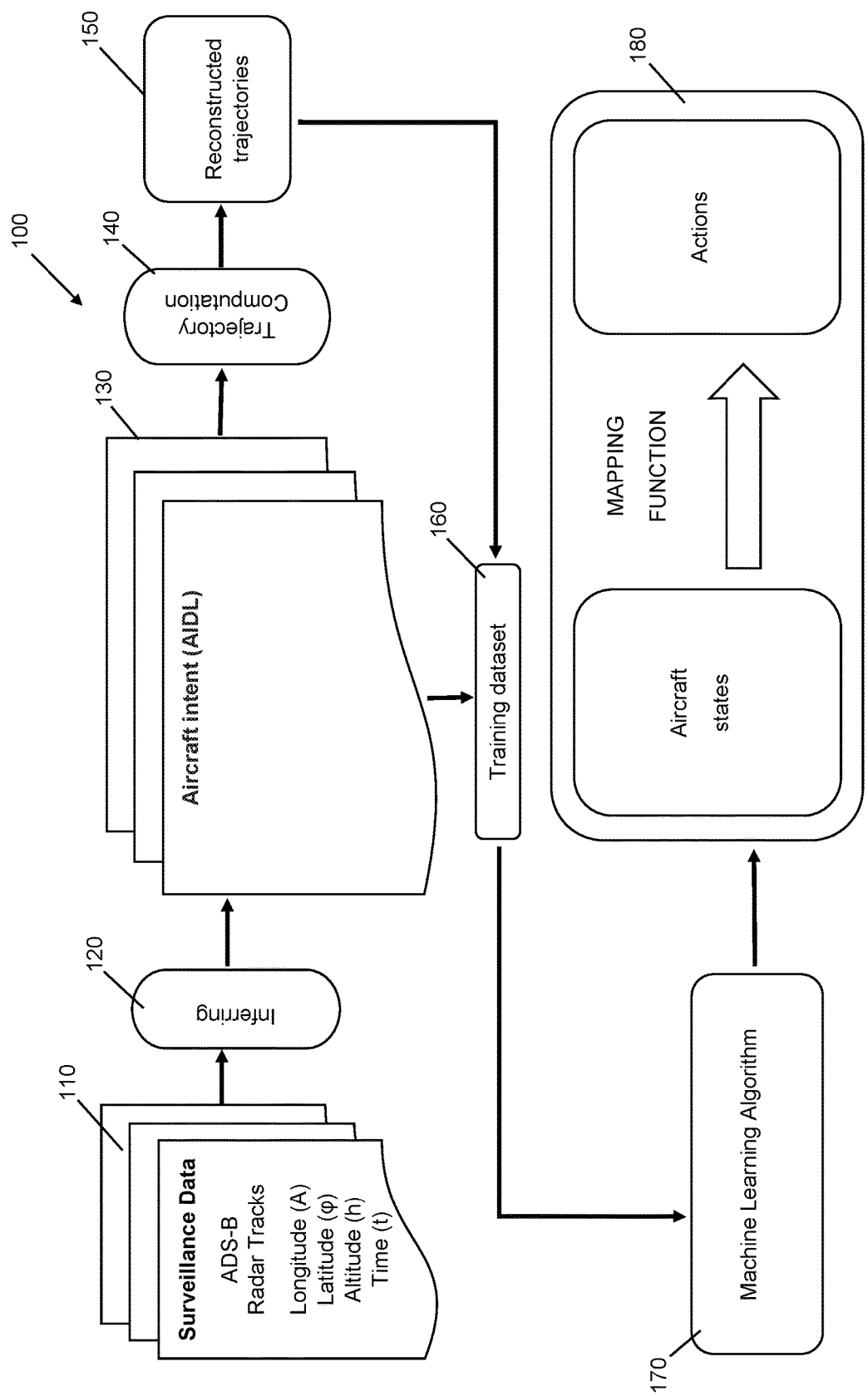
FIG. 1 represents a schematic diagram of a pre-flight training step.

The method of autonomously operating an aircraft comprises a pre-flight training step and a real-time control step executed during the flight of an aircraft covering a determined route. FIG. 1 depicts an overall view of a pre-flight training step 100, in which recorded surveillance data 110 of a plurality of flights is first retrieved, for instance by accessing a database containing multiple ADS-B data and/or radar tracks data. For each flight, the surveillance data 110 includes at least changes of aircraft position (longitude Δ, latitude φ, altitude h) over time (t).

Then, an inferring step 120 is applied on the recorded surveillance data 110 to obtain inferred aircraft intent 130, preferably expressed in AIDL format. Using the inferred aircraft intent 130, reconstructed trajectories 150 are computed in a trajectory computation step 140. A machine learning algorithm 170 is applied on a training dataset 160 comprising aircraft intent 130 and reconstructed trajectories 150 corresponding to the aircraft type and route of interest (the recorded surveillance data 110 may comprise data from different routes and aircraft types, which are not relevant for the particular aircraft). The result of the machine learning algorithm 170 is a mapping function 180 relating aircraft states with actions, which will be later explained in detail.

Figure 2:
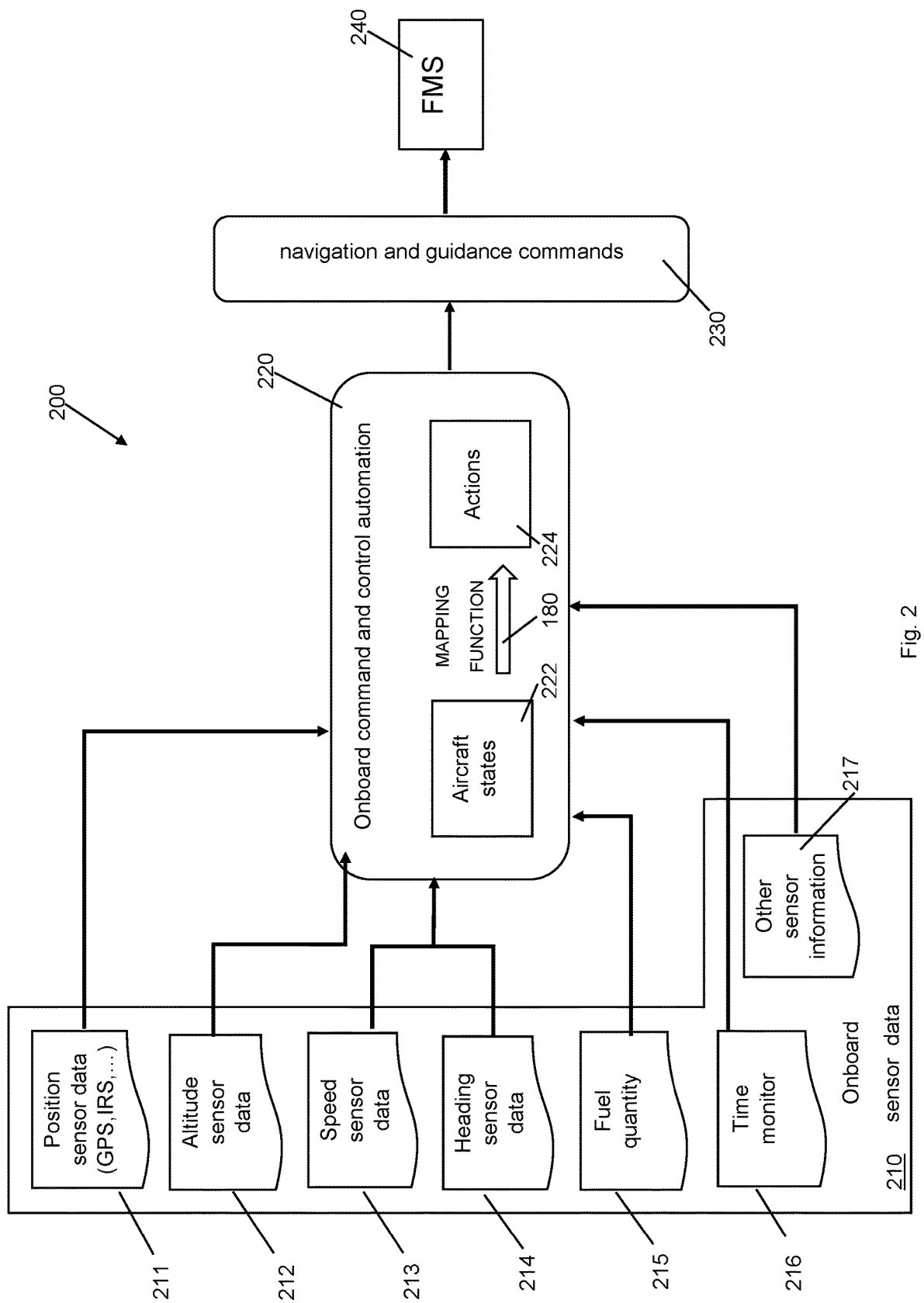
FIG. 2 depicts a diagram of a real-time control step executed onboard during the flight.

In FIG. 2 a diagram represents the real-time control step 200 executed onboard during the flight. The training step 100 must have been previously finished. Onboard sensor data 210 (such as position 211, altitude 212, speed 213, heading 214, fuel quantity 215, time 216 or other sensor information 217) from sensors installed onboard the aircraft are repeatedly captured in an onboard command and control automation process 220. Using the retrieved onboard sensor data 210, the onboard command and control process 220 obtains real-time aircraft states 222 and applies the mapping function 180 previously determined in the pre-flight training step 100 to determine actions 224 associated to the real-time aircraft states 222. The mapping function 180 must be understood in a broad sense as a mapping process, relationship or a correlation that allows determining actions 224 for given aircraft states 222. In an embodiment, the mapping process comprises a lookup in a mapping table searchable by sensor values (such as position, altitude, speed, heading, fuel, time and others) that returns six AIDL instructions (one per AIDL thread) per search. Every row in the mapping table is a state-action vector, wherein the states 222 are the sensor values and the action 224 is the AIDL instruction associated to the state. The mapping table does not necessarily include all possible mappings between sensor data 210 and AIDL instructions to execute instantly; in these cases interpolation (any known interpolation method) will be needed. The output of the onboard command and control process 220 comprises a set of navigation and guidance commands 230, corresponding to the actions 224, which are executing by the aircraft Flight Management System, FMS 240. In an embodiment, the navigation and guidance commands 230 include AIDL instructions.

Figure 3:
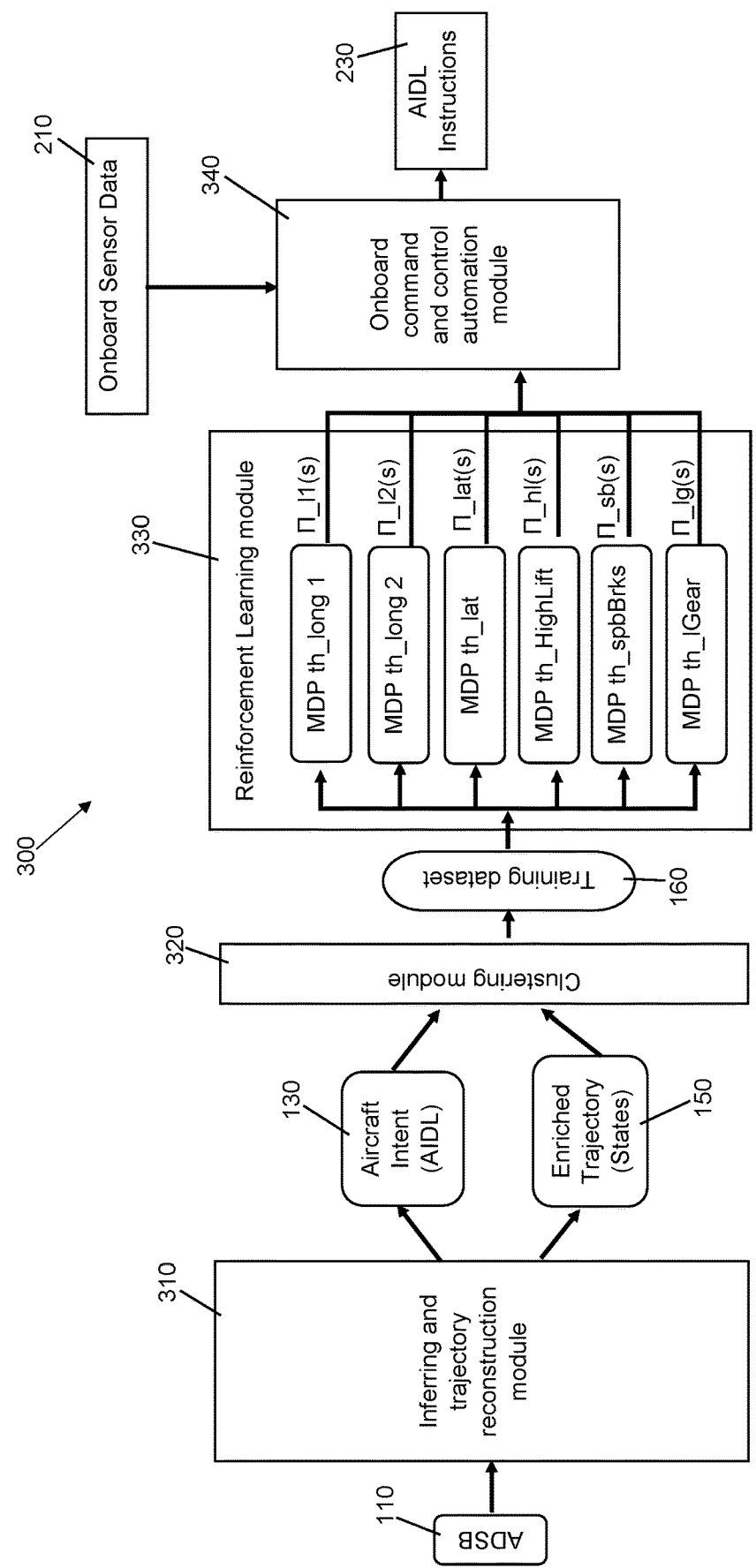
FIG. 3 represents a block diagram describing an embodiment of the method of autonomously operating an aircraft.

A block diagram describing an embodiment of a system for autonomously operating an aircraft 300 is depicted in FIG. 3. According to the diagram, an inferring and trajectory reconstruction module 310 receives as input surveillance data 110 for aviation domain from one or more sources, such as RADAR, ADS (ADS-C/ADS-B), QAR.

Inferring and trajectory reconstruction techniques are applied to recorded surveillance data 110. Different known inferring and trajectory reconstruction techniques may be applied; for instance, the ones disclosed in patent documents U.S. Pat. No. 8,977,484-B1, U.S. Pat. No. 9,366,538-B2 and EP3109805-A1.

Inference algorithms are based on the assumption that the aircraft motion can be represented as a point-mass model that makes possible to compute the aircraft intent 130 that best describes the actual trajectory registered in the surveillance data 110. Using the recorded surveillance data 110 and linking them to the weather forecasts that represent the atmospheric conditions about the planned route on the day of operation, inferring algorithms allow generating an aircraft intent 130.

The method also comprises analyzing the recorded surveillance data 110 and determining the aircraft type and computing aircraft performance data relating to that type of aircraft. For example, radar traces or other radar/ADS data may be used to identify each aircraft's call sign or tail number, which may be compared with records to determine the aircraft type.

Even considering ADS-B messages, which contain broader information than typical position data included in radar tracks (latitude, longitude and altitude over time), the availability of accurate information about airspeeds and ground speed is almost ineffective, while aircraft mass, which is the key state variable to compute other related kinetic state variables, is not available.

However, making use of inferred aircraft intent 130 generated from the recorded surveillance data 110, it is possible to launch an aircraft mass inference and a trajectory reconstruction process that will populate the state vector adding times (increased granularity) and state variables (state vector enrichment) not included in the original surveillance-based trajectory representation.

Therefore, the result of the inference and trajectory reconstruction stage applied to recorded flight data of a given flight includes the aircraft intent 130 instance and the reconstructed trajectory 150 that matches the original raw surveillance data 110 corresponding to that flight.

Both datasets (130, 150) are used as inputs to a reinforcement learning module 330 implementing a machine learning algorithm 170 (in particular, a reinforcement learning algorithm). Before applying the reinforcement learning, a clustering module 320 applies a clustering process on the reconstructed trajectories 150 and the aircraft intent data 130, which are classified by aircraft type and route (departure-destination on the flight plan) in order to select a training dataset 160 referred to the particular aircraft model and route of the aircraft to which the autonomous control method is being applied.

Reinforcement learning techniques are then applied on the training dataset 160. In such scenario, an onboard command and control automation module 340 may model the aircraft being in a state $s \in S$ (S is the set of all possible states) and is configured to determine actions $a \in A$ (A is the set of all possible actions) to be executed by the aircraft control system (e.g. the FMS 240). During the reinforcement learning, the onboard command and control automation module 340 also gets a reward R, which is a scalar value and assumed to be a function of the state s observed. The goal of reinforcement learning is to find a mapping from aircraft states to actions, called policy π, that picks actions a in given state s, maximizing the cumulative expected reward.

So, in the reinforcement learning stage, an onboard command and control automation module 340 explores the space of possible strategies and receives feedback on the outcome about the decision taken. From this information, an optimal policy must be deduced when maximizing the accumulated reward R received.

The components in AIDL format can be mapped to reinforcement learning parameters as follows:

I. Action: Is a command executed by the aircraft FMS 240 that produces an effect on the aircraft motion. AIDL alphabet contains 35 possible basic actions that is increased when considering action specifiers.

II. State: Is defined by the readings of the sensors onboard. In general, multiple variables can define the aircraft state, and many of them are highly correlated:

| | | |
|---|---|---|
| $\lambda$ | longitude | Longitude of center of gravity |
| $\varphi$ | latitude | Geodetic latitude of center of gravity |
| d | distance | Total Horizontal Distance |
| Hp | altitude | Geopotential Pressure Altitude |
| Vcas | speed | Calibrated Airspeed |
| M | speed | Mach Number |
| t | time | Total time elapsed |
| $_x$TAS | bearing | Aerodynamic yaw angle |
| m | mass | Aircraft Mass |

III. Reward: In general, the maximum reward will be associated to the state that matches the successful landing of the flight at the destination airport. The reinforcement learning method take care about back-propagating the reward.

The set of variables that determines the aircraft state may be the outcome of several different sensors on the aircraft (e.g. position is obtained from both GPS and IRS—inertial reference system—), thus reducing the state error. That error is small compared to the one that the inferred aircraft intent injects into the system, and for that reason in an embodiment Markov Decision Process (MDP) is preferably selected as framework to model the problem.

A MDP is defined as a 4 element tuple {S,A,R,T} where S is a set of states, A is a set of actions, R is the reward function that maps each state/action pair with a real value and T is the Markovian state transition function T(s'|s,a) that represents the probability of transitioning from state s to s' after executing the action a. The goal is to find a policy π(s) that determines which action to select from a state based on the past history of states and actions. An optimal policy is the one that maximizes the expected utility, where the utility of a policy can be evaluated using Dynamic Programming (DP).

The problem composed by the equations of motion contains six degrees of freedom that must be closed by the six active instructions (i.e. actions), each of them adding its effect constraint as an algebraic equation that closes a specific degree of freedom. Based on AIDL definition, actions are assigned to groups and only one instruction per group can be active in parallel. At the same time, inferring methods are based on pattern recognition, what leads to an aircraft intent that uses a subset of instructions and actions, so baseline intents are parameterized to match observed aircraft surveillance data.

Therefore, the problem can be decomposed into 6 independent MDP's because 6 independent instructions are being predicted, where action and state spaces are different for each thread, and in all cases are a reduced subset of original space and action spaces. Additional post-processing on longitudinal threads 1 & 2 is executed, not applying none of the predicted instruction in case of two instructions of the same group being active at the same time—that would not be executable on the cockpit—. So, from the point of view of reinforcement learning, it can be assumed that the AIDL threads are totally decoupled.

System dynamics and reward function are not known exactly over the state space. Model-free reinforcement learning does not require building explicit representations of the transition and reward models. The onboard command and control automation module 340 must generalize from limited experience to states that have not yet been visited on training data 160. The assumption in local approximation methods is that states that are close together are likely to have similar state-action value.

For each of the 6 threads, a limited number of state/action values will be stored on memory, obtained from data using maximum likelihood estimation. For instance, the state/action values may be stored on a table having N columns, where the first N−1 columns may be values captured by the onboard sensors and the last AIDL instruction to execute. The table is obtained as a result to solving the 6 independent MDP's (a direct mapping). As most of the variables are continuous, it is normally necessary to use interpolation. Then, to train the system, all continuous state variables are discretized using buckets that can be easily reconfigured in order to be able to adjust the optimal bucket size based on experimentations. A simple example of bucket sizes for several aircraft states:

| Bucket size | | Range | |
| --- | --- | --- | --- |
| λ | 0.1 deg | | Depends on the are used on clustering |
| φ | 0.1 deg | | Depends on the are used on clustering |
| d | 5 miles | | Depends on the city pairs selected on clustering |
| Hp | 500 ft | −500-53000 | |
| Vcas | 5 kt | 0-500 | |

Q-learning algorithm, a reinforcement learning technique, is then executed, estimating state-action value function (table mapping the sensor values to an AIDL instruction) based on neighbor states. Alternatively, other techniques such as SARSA (State-Action-Reward-State-Action) may be employed instead of Q-Learning. Solving the MDP's completes the training step 100, obtaining the mapping function 180.

Once the training step 100 is completed, the real-time control step 200 during flight phase starts. Based on onboard sensor data 210, the onboard command and control automation module 340 is capable of selecting the optimal action from each MDP solution (6 AIDL instructions). One important capability of the method is that the onboard command and control automation system reacts in real time to sensor data changes. Training phase results are stored on system memory, so accessing to the optimal action at every situation is extremely fast.

The output of the onboard command and control automation module 340 a set of navigation and guidance commands 230 including AIDL instructions. During the flight, the onboard command and control automation module 340 is able to operate just combining the 6 optimal actions on an AIDL operation and executing that operation.

We claim:

1. A method of autonomously operating an aircraft, comprising:
   prior to flight of the aircraft:
      retrieving recorded surveillance data of a plurality of flights corresponding to at least one aircraft type and at least one route,
      inferring aircraft intent from the recorded surveillance data,
      computing reconstructed trajectories by using the aircraft intent,
      selecting a training dataset comprising the aircraft intent and the reconstructed trajectories of flights corresponding to a particular aircraft type and route, and
      applying a machine learning algorithm on the training dataset to obtain a mapping function between aircraft states and actions comprising navigation and guidance commands to autonomously operate the aircraft, and wherein the mapping function comprises a table mapping sensor values with Aircraft Intent Description Language (AIDL) instructions; and
   during the flight of the aircraft:
      repeatedly retrieving onboard sensor data,
      obtaining real-time aircraft states from the onboard sensor data,
      determining the actions associated to the real-time aircraft states by using the mapping function,
      wherein the determining of the actions comprises searching the table for the sensor values corresponding to the onboard sensor data and, if no exact match is found, using an interpolation process to determine AIDL instructions for the sensor values corresponding to the onboard sensor data, and
      autonomously operating the aircraft by executing the actions on the aircraft.

2. The method of claim 1, wherein the aircraft intent is expressed in AIDL format.

3. The method of claim 1, wherein the actions are expressed as AIDL instructions.

4. The method of claim 1, wherein the recorded surveillance data comprises at least one of Automatic Dependent Surveillance Broadcast (ADS-B) data, radar tracks data, or flight Quick Access Recorder data.

5. The method of claim 1, wherein the machine learning algorithm is a reinforcement learning algorithm that obtains a policy π by maximizing an accumulated reward R associated to the aircraft state that matches a landing of the flight at a destination airport.

6. The method of claim 5, wherein the reinforcement learning algorithm comprises solving six independent Markov Decision Processes (MDPs) for predicting six independent AIDL instructions, wherein action and state spaces are different for each AIDL thread.

7. The method of claim 1, wherein the machine learning algorithm is one of a Q-learning algorithm or a state-action-reward-state-action (SARSA) algorithm.

8. The method of claim 1, wherein the onboard sensor data comprises at least one of position, altitude, speed, heading, fuel quantity, or time.

9. A computer program product for autonomously operating an aircraft, comprising at least one non-transitory computer-readable storage medium comprising a set of instructions stored therein which, when executed by a processor, causes the processor to perform a method comprising:

prior to flight of the aircraft:
retrieving the recorded surveillance data of the plurality of flights corresponding to the at least one aircraft type and the at least one route,
inferring the aircraft intent from the recorded surveillance data,
computing the reconstructed trajectories by using the aircraft intent,
selecting the training dataset comprising the aircraft intent and the reconstructed trajectories of the flights corresponding to the particular aircraft type and the route, and
applying the machine learning algorithm on the training dataset to obtain the mapping function between the aircraft states and the actions comprising the navigation and guidance commands to autonomously operate the aircraft, and wherein the mapping function comprises the table mapping the sensor values with the AIDL instructions; and during the flight of the aircraft:
repeatedly retrieving the onboard sensor data,
obtaining the real-time aircraft states from the onboard sensor data,
determining the actions associated to the real-time aircraft states by using the mapping function,
wherein the determining of the actions comprises searching the table for the sensor values corresponding to the onboard sensor data and, if no exact match is found, using the interpolation process to determine the AIDL instructions for the sensor values corresponding to the onboard sensor data, and
autonomously operating the aircraft by executing the actions on the aircraft.

10. A system for autonomously operating an aircraft, comprising:
an inferring and trajectory reconstruction module configured to infer aircraft intent from recorded surveillance data of a plurality of flights corresponding to at least one aircraft type and at least one route, and to compute reconstructed trajectories by using the aircraft intent;
a clustering module configured to select a training dataset comprising the aircraft intent and the reconstructed trajectories of flights corresponding to a particular aircraft type and route;
a machine learning module configured to apply a machine learning algorithm on the training dataset to obtain a mapping function between aircraft states and actions comprising navigation and guidance commands to autonomously operate the aircraft, and wherein the mapping function comprises a table mapping sensor values with Aircraft Intent Description Language (AIDL) instructions; and
an onboard command and control automation module configured to repeatedly retrieve onboard sensor data during a flight of the aircraft, to obtain real-time aircraft states from the onboard sensor data, to determine the actions associated to the real-time aircraft states by using the mapping function, to determine the actions by searching the table for the sensor values corresponding to the onboard sensor data and, if no exact match is found, to use interpolation to determine AIDL instructions for the sensor values corresponding to the onboard sensor data, and to autonomously operate the aircraft by instructing execution of the actions on the aircraft.

11. The system of claim 10, wherein the aircraft intent is expressed in AIDL format.

12. The system of claim 10, wherein the actions are expressed as AIDL instructions.

13. The system of claim 10, wherein the machine learning module is a reinforcement learning module configured to obtain a policy 7C by maximizing an accumulated reward R associated to the aircraft state that matches a landing of the flight of the aircraft at a destination airport.

14. The system of claim 13, wherein the reinforcement learning module is configured to solve six independent Markov Decision Processes (MDPs) for predicting six independent AIDL instructions, wherein action and state spaces are different for each AIDL thread.

15. The system of claim 10, further comprising an aircraft Flight Management System (FMS) for executing the actions on the aircraft.

16. The system of claim 10, further comprising a processor to execute instructions; and memory to store the instructions, wherein the instructions comprise at least one of the inferring and trajectory reconstruction module, the clustering module, the machine learning module, or the onboard command and control automation module.

17. The method of claim 1, wherein every row of the table is a state-action vector.

18. The system of claim 10, wherein every row of the table is a state-action vector.

19. The system of claim 10, wherein the machine learning algorithm is one of a Q-learning algorithm or a state-action-reward-state-action (SARSA) algorithm.

20. The system of claim 10, wherein the onboard sensor data comprises at least one of position, altitude, speed, heading, fuel quantity, or time.

* * * * *

UNITED STATES PATENT AND TRADEMARK OFFICE
CERTIFICATE OF CORRECTION

PATENT NO. : 10,983,533 B2  
APPLICATION NO. : 15/990447  
DATED : April 20, 2021  
INVENTOR(S) : Pablo Costas Page 1 of 1

It is certified that error appears in the above-identified patent and that said Letters Patent is hereby corrected as shown below:

In the Claims

In Column 10, Line 24, in Claim 13, delete "7C" and replace with -- $\pi$ --

Signed and Sealed this  
Fifteenth Day of June, 2021

Drew Hirshfeld  
*Performing the Functions and Duties of the*  
*Under Secretary of Commerce for Intellectual Property and*  
*Director of the United States Patent and Trademark Office*